J. M. VAN DYKE & F. R. ROWELL.
CLUTCH.
APPLICATION FILED NOV. 28, 1908.
924,404.
Patented June 8, 1909.
3 SHEETS—SHEET 2.
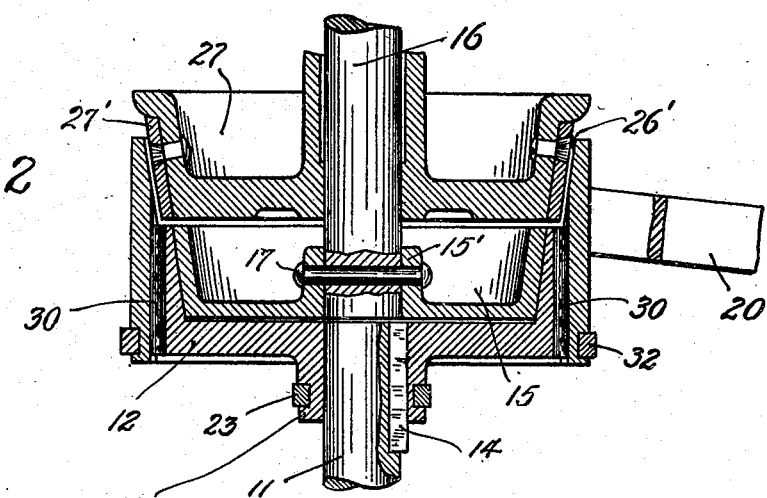
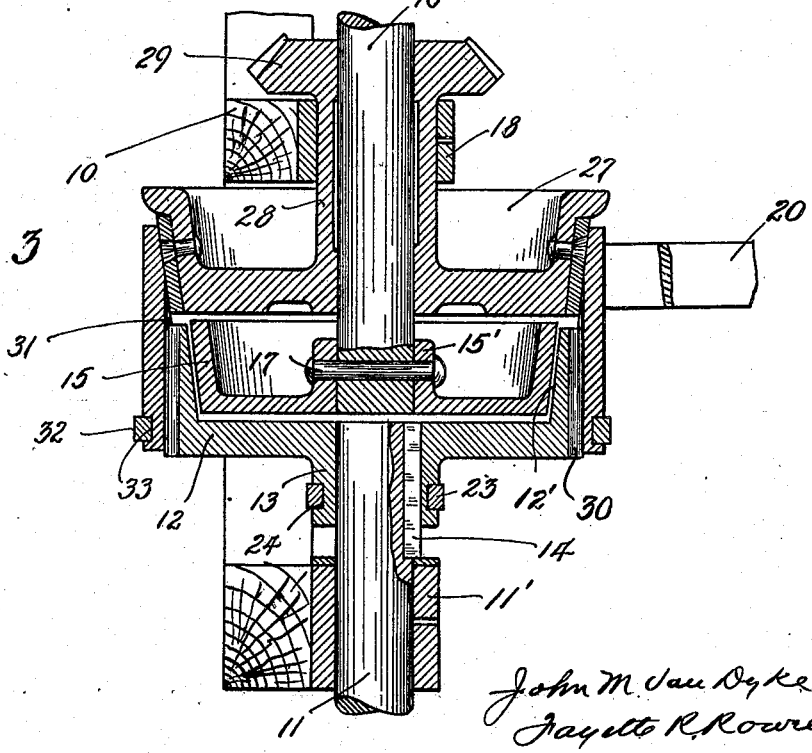

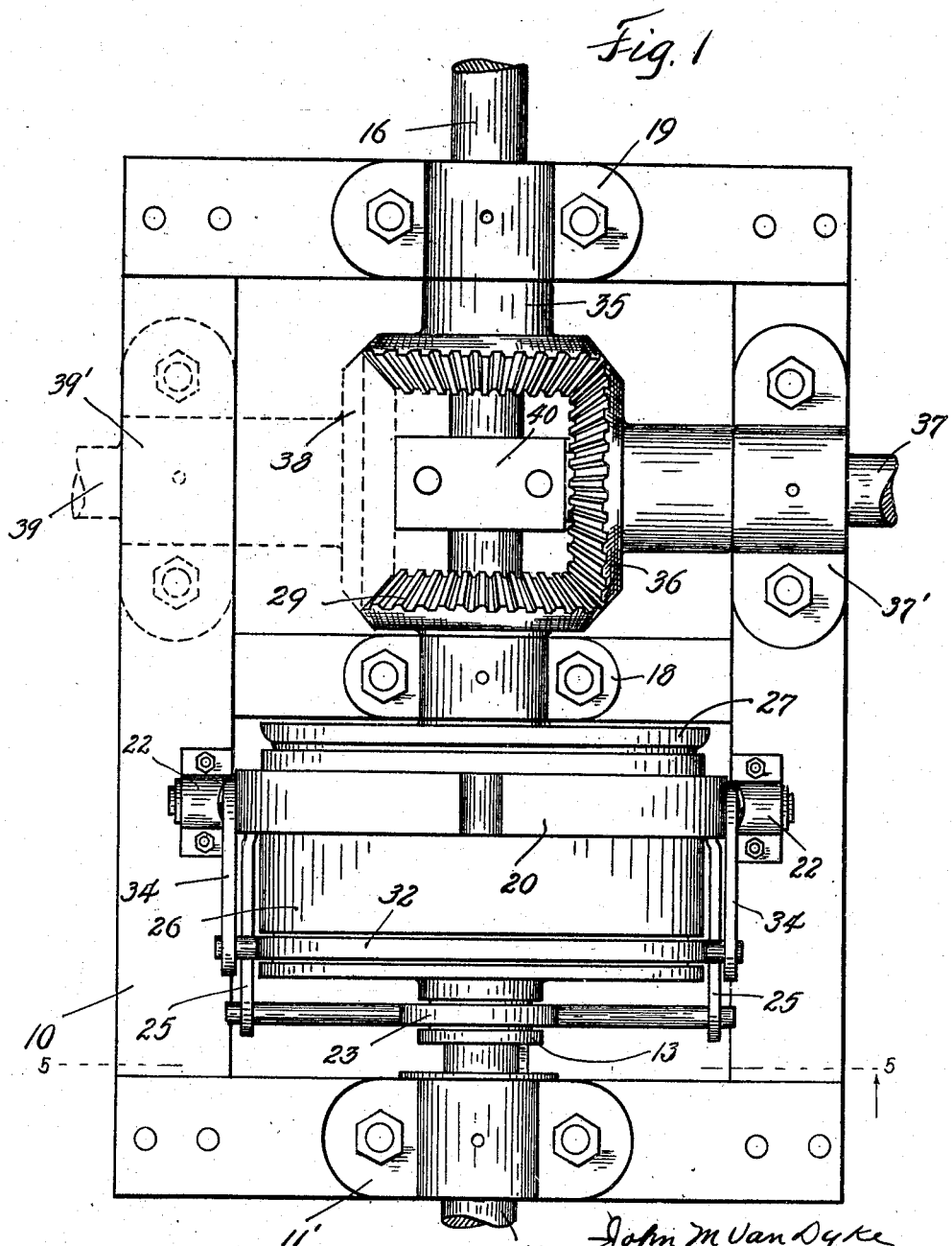

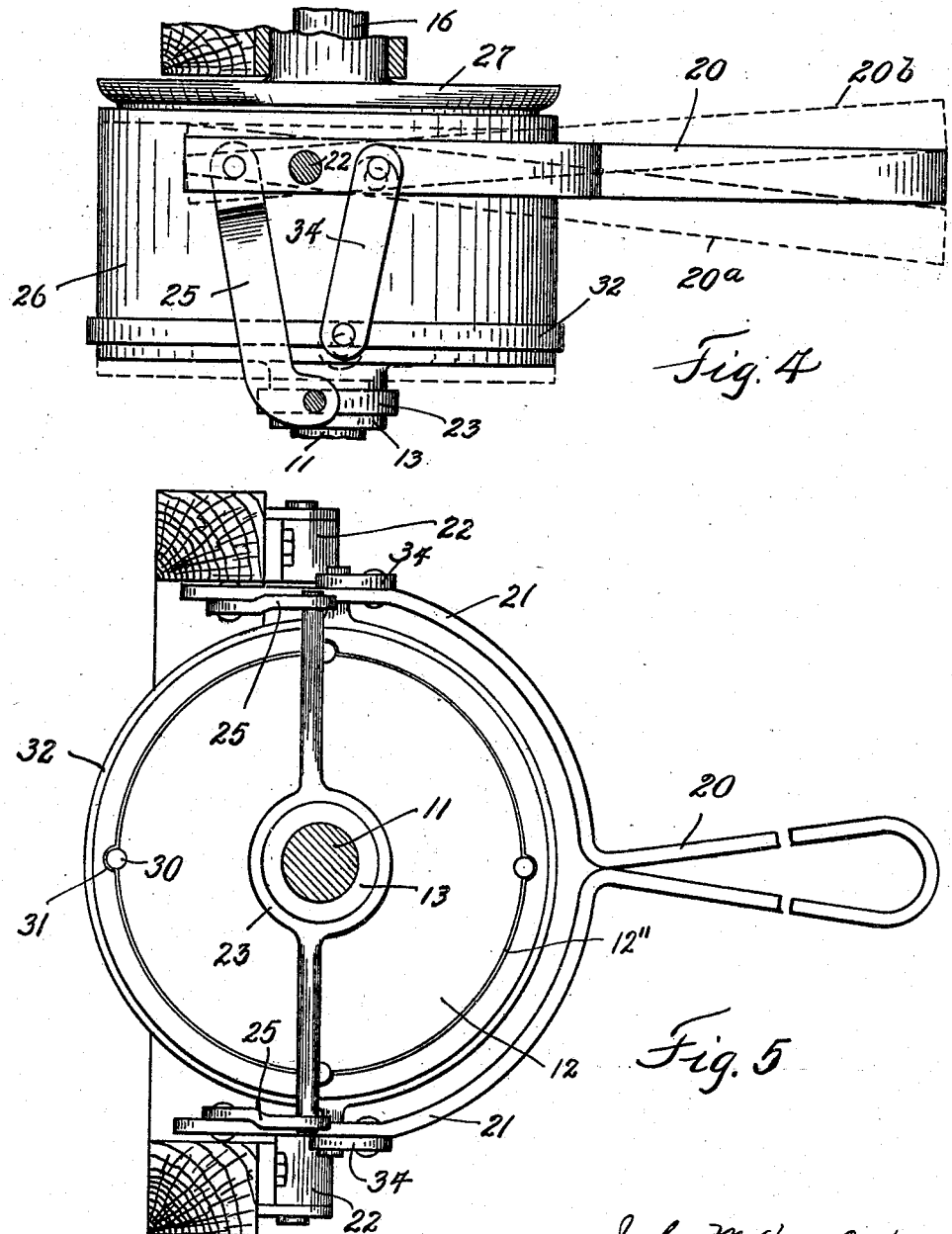

UNITED STATES PATENT OFFICE.

JOHN M. VAN DYKE AND FAYETTE R. ROWELL, OF CANASTOTA, NEW YORK.

CLUTCH.

No. 924,404.  Specification of Letters Patent.  Patented June 8, 1909.

Application filed November 28, 1908. Serial No. 464,812.

*To all whom it may concern:*

Be it known that we, JOHN M. VAN DYKE and FAYETTE R. ROWELL, citizens of the United States, residing at Canastota, in the county of Madison and State of New York, have invented certain new and useful Improvements in Clutches, of which the following is a specification.

This invention relates to power transmitting apparatus, and has especial reference to a novel form of clutch mechanism, having certain advantages hereinafter fully set forth and illustrated in the accompanying drawings, in which—

Figure 1 is a face view of the clutch mechanism together with certain details of machine connections therefor; Fig. 2 is a substantially central sectional view of the clutch cones and cups, with one set of the same in operative engagement; Fig. 3 is a corresponding view showing the other set of clutch members in engagement and illustrating a fragment of the supporting frame; Fig. 4 is a face view showing the operating devices for the clutch mechanism in mid position, and Fig. 5 is an end view of the clutch mechanism and transverse section on the line 5—5 of Fig. 1.

Throughout the following detail description and on the several figures of the drawings similar parts are referred to by like reference characters.

The clutch mechanism constituting the subject-matter of this invention is adapted for application to various types of machines, such as motor-vehicles, motor boats, machine shop work, and the like.

At 10 is illustrated any suitable form of substantial frame in or upon which the various features of construction constituting this invention may be mounted. A drive shaft 11, which may be driven from any suitable source of power, is mounted for rotation in a bearing 11' connected to said frame. On the inner end of said shaft 11 is mounted a clutch cup 12 having a hub 13, between which and the said drive shaft end is a feather 14, providing a connection between the cup and the shaft which permits the cup to slide longitudinally of the shaft but yet insuring the rotation of the cup from the shaft. Said clutch member 12 is provided on its inner surface with a conical surface 12' which is adapted to receive a correspondingly formed surface of a clutch cone 15 mounted upon a driven shaft 16 in any suitable manner, preferably by being provided with a hub 15' through which and the end of the shaft a locking key 17 is passed. The shaft 16 is journaled in the frame 10 at bearings 18 and 19 and in the same axial line as the driven shaft. When the clutch members 12 and 15 are in engagement the driven shaft will rotate in the same direction as the drive shaft. In order to effect the proper sliding movement of the cup 12 to cause it to engage with the cone 15 any suitable means may be provided, but preferably we employ a lever 20 having yoke arms 21 pivoted on the frame in bearings 22 on opposite sides of the clutch mechanism proper. A yoke 23 has loose engagement in a groove 24 surrounding the hub 13, and said yoke 23 has connection with the lever aforesaid through a pair of links 25, said lever 20 being with respect to the yoke 23 a lever of the first class.

The exterior surface 12'' of the cup 12 may be of any suitable contour to accomplish the objects of our invention, but preferably it is made substantially cylindrical and mounted thereon is a second clutch cup 26, which is in the form of a hollow cylinder or tubular throughout the greater part of its extent, but is provided at one end with an inner conical face 26' adapted to receive the corresponding face of a second clutch cone 27 journaled upon the driven shaft 16. The cone 27 has a tubular hub 28 journaled within the bearing 18 and upon whose outer end is a gear 29. The gear 29 may be of any desired type but is indicated as being a miter gear. The conical face of the member 27 may be provided with a removable wear strip or facing 27' if desired. The cup 26 is mounted for longitudinal sliding movement on the outer face 12'' of the first mentioned cup, but is prevented from relative rotation thereon by any suitable irregularities on the adjacent surfaces of the members. The construction illustrated and preferred by us comprises a series of keys 30 carried by one of the cups and entering grooves 31 in the other cup. In order to move the outer cup 26 with respect to the inner cup a yoke 32 is applied thereto in a groove 33. The yoke 32 has connection with the lever 20 by means of a pair of links 34 connected to said lever between the handle and the lever pivots, whereby the lever with respect to the yoke 32 is a lever of the second class.

Mounted rigidly in any suitable manner upon the driven shaft 16 is a miter gear 35, and in order to drive said gear 35 and shaft to which it is secured from the gear 29 an intermediate gear 36 having meshing engagement with the aforesaid gears is employed. The gear 36 may be mounted in any suitable manner for this purpose either on a stud or upon a shaft 37 to be driven therefrom. An additional gear 38 and shaft 39 may be employed and driven from the same source if desired. The auxiliary shafts 37 and 39 may be located in any suitable planes with respect to the plane of the frame 10, but as indicated are secured in substantially the same plane as the first mentioned shafts and are mounted in bearings 37' and 39' respectively. A clamp 40 may be employed if desired to retain the shafts 37 and 39 in proper operative relation to each other.

The operation of the clutch mechanism is substantially as follows: Power being applied to the shaft 11 to drive it in a certain direction, the cup 12 will be driven in the same direction. If the lever 20 be thrown to the position shown in the dotted lines 20ª in Fig. 4 the said cup will be shifted into contact with the cone 15, whereby the latter and the shaft 16 will be driven in unison with the drive shaft 11, such movement being also imparted to the gear 35. Should it be desired to reverse the direction of the driven shaft 16, without stopping or reversing the direction of the shaft 11, the lever 20 will be shifted to the position indicated by the dotted lines 20ᵇ, with the result that the cup 12 will be shifted out of engagement with the cone 15 and the cup 26 will be shifted into engagement with the cone 27. Since the cup 26 is mounted upon and receives its power from the cup 12, the cup 26 will drive the cone 27 in the same direction as the drive shaft, but the motion of the cone 27 will be transmitted to the gear 35 and driven shaft through the gear 36 with a resulting change in direction of the driven shaft, the cone 15 at this time running idly within the cup 12. The lever 20 being brought to the mid position indicated in full lines in Fig. 4 the driven shaft may be stopped, whether or not the drive shaft is stopped. It is to be noted that a single element 20 is sufficient to operate both sets of cups and cones.

Having thus described our invention, what we claim as new, is:

1. The herein described clutch mechanism comprising a drive shaft and a cup mounted slidably thereon and driven thereby, a driven shaft, a cone rigidly mounted on said driven shaft for coöperation with the cup aforesaid, a second cup slidably mounted on the first cup and rotatable therewith, a second cone for coöperation with the second cup and journaled on the driven shaft for rotation independently of the first cone, and means for causing the engagement of either of said cups with its cone while the other cup remains separated from its cone.

2. The herein described clutch mechanism, comprising a drive shaft, a cup mounted thereon, means permitting sliding movement of the cup on said shaft but causing rotation thereof together, a driven shaft in alinement with the drive shaft, a cone mounted on said driven shaft and adapted to coöperate with the cup aforesaid, a second cup slidably mounted on the first cup, a second cone concentric with the driven shaft and adapted to be engaged by the second cup, and means to move the cups simultaneously in opposite directions to control the engagement thereof with the respective cones.

3. The herein described clutch mechanism comprising a drive shaft, a cup slidably mounted thereon, a driven shaft, a cone mounted on the driven shaft and coöperating with the cup aforesaid, a second cup slidably mounted on the first cup, a series of keys connected with one of the said cups and coöperating with the other to cause simultaneous rotation thereof, a second cone concentric with the driven shaft and adapted to coöperate with the second cup, a lever, and means between said lever and the respective cups whereby the cups are moved simultaneously in opposite directions to control engagement thereof with the respective cones.

4. In a clutch mechanism, the combination of a drive shaft, a cup slidable thereon and being provided with a hub, means to cause rotation of the cup and hub from the drive shaft, a driven shaft, a cone secured to the driven shaft, and means including a lever of the first class to cause the cup and hub to slide upon the drive shaft into or out of engagement with the cone.

5. In a clutch mechanism, the combination of a drive shaft, a cup slidable thereon, means to cause rotation of the cup from the drive shaft, a driven shaft, a cone secured to the driven shaft and adapted to coöperate with said cup, a second cone journaled on the driven shaft, a second cup slidable on the first cup for coöperation with the second cone, a driving connection between the journaled cone and the driven shaft and a lever associated with both of said cups to cause engagement thereof with their respective cones alternately, said lever being of the first class as to one of the cups and of the second class as to the other.

6. In a clutch, the combination with a driving shaft and a secondary shaft operatively mounted in the same axial line on a common frame, of a cup slidably mounted on said driving shaft and having a central hub, a yoke mounted on said central hub for reciprocally operating said cup, a cone rigidly mounted on said secondary shaft coaxial with said cup and adapted to be engaged by said cup, a lever pivoted on said frame and connected, by means of a pair of links, to said yoke, adapted to shift said cup toward or away from the said cone, substantially as described.

7. A clutch comprising a driving shaft journaled on a frame, a secondary shaft journaled on the frame and disposed in the same line axially as said driving shaft, a cup loosely mounted on said driving shaft, a key to drive the cup, a yoke operatively fitted to a hub on said cup, a forked lever pivotally mounted on the opposite sides of the frame, a pair of links to connect the lever to the opposite ends of the yoke for reciprocally operating said cup on the driving shaft, a cone rigidly mounted on said secondary shaft in position to be frictionally engaged by said cup, for the purpose of driving said secondary shaft when the latter cone is shifted by said lever, substantially as described.

In testimony whereof we affix our signatures in presence of two witnesses.

JOHN M. VAN DYKE.
FAYETTE R. ROWELL.

Witnesses:
J. W. WILSON,
W. H. PERCIVAL.